United States Patent
Ragogna (10) Patent No.: US 9,258,870 B2
(45) Date of Patent: Feb. 9, 2016

(54) METHOD FOR OPERATING A DRUM LIGHTING DEVICE IN A LAUNDRY TREATMENT MACHINE AND LAUNDRY TREATMENT MACHINE IMPLEMENTING THE METHOD

(75) Inventor: Roberto Ragogna, Malnisio (IT)

(73) Assignee: Electrolux Home Products Corporation N.V., Brussels (BE)

( * ) Notice: Subject to any disclaimer, the term of this patent is extended or adjusted under 35 U.S.C. 154(b) by 259 days.

(21) Appl. No.: 13/990,240

(22) PCT Filed: Nov. 23, 2011

(86) PCT No.: PCT/EP2011/070856
§ 371 (c)(1),
(2), (4) Date: May 29, 2013

(87) PCT Pub. No.: WO2012/072470
PCT Pub. Date: Jun. 7, 2012

(65) Prior Publication Data
US 2013/0257275 A1      Oct. 3, 2013

(30) Foreign Application Priority Data
Nov. 29, 2010 (EP) .................................. 10192893

(51) Int. Cl.
| | |
|---|---|
| *B60Q 7/00* | (2006.01) |
| *H05B 37/02* | (2006.01) |
| *D06F 33/02* | (2006.01) |
| *D06F 37/00* | (2006.01) |

(Continued)

(52) U.S. Cl.
CPC ............ *H05B 37/0209* (2013.01); *D06F 33/02* (2013.01); *D06F 37/00* (2013.01); *D06F 39/12* (2013.01); *B60Q 3/0293* (2013.01)

(58) Field of Classification Search
CPC ..................................................... B60Q 3/0293
USPC ......................................................... 315/84
See application file for complete search history.

(56) References Cited

U.S. PATENT DOCUMENTS

| | | | |
|---|---|---|---|
| 5,795,052 A * | 8/1998 | Choi | ............................... 362/91 |
| 5,869,932 A | 2/1999 | Choi | |

FOREIGN PATENT DOCUMENTS

| | | |
|---|---|---|
| EP | 1918448 A1 | 5/2008 |
| JP | 6190186 | 7/1994 |

(Continued)

OTHER PUBLICATIONS

International Search Report mailed Feb. 10, 2012 in corresponding International Application No. PCT/EP2011/070856.

(Continued)

*Primary Examiner* — John Poos
(74) *Attorney, Agent, or Firm* — Banner & Witcoff, Ltd.

(57) ABSTRACT

Method for operating a laundry treatment machine comprising an outer casing (2) provided with a door (8), a drum (3) mounted inside the outer casing, a drum lighting device (9) arranged inside the outer casing and operable to light the drum, and a control unit (11) adapted to control the lighting device; the method comprises: —switching-on drum lighting device if the control unit detects a preset action performed by a user on the laundry treatment machine and/or a preset state of the laundry treatment machine and/or of the drum lighting device; —switching-off drum lighting device if the control unit detects a preset action performed by a user on the laundry treatment machine and/or a preset state of the laundry treatment machine and/or of the drum lighting device. There is a delay between the detection by the control unit of the preset action performed by a user on the laundry treatment machine and/or a preset state of the laundry treatment machine and/or of the drum lighting device, and the switching-off of the drum lighting device.

17 Claims, 4 Drawing Sheets

(51) Int. Cl.
*D06F 39/12* (2006.01)
*B60Q 3/02* (2006.01)

(56) References Cited

FOREIGN PATENT DOCUMENTS

| JP | 10263279 | 10/1998 |
| JP | 2006223571 A | 8/2006 |
| WO | 2006042819 A1 | 4/2006 |
| WO | 2007021082 A2 | 2/2007 |

OTHER PUBLICATIONS

Extended European Search Report dated Apr. 18, 2011 in corresponding EP Application No. 10192893.5.

* cited by examiner

METHOD FOR OPERATING A DRUM LIGHTING DEVICE IN A LAUNDRY TREATMENT MACHINE AND LAUNDRY TREATMENT MACHINE IMPLEMENTING THE METHOD

The present invention relates to a method for operating a drum lighting device in a laundry treatment machine and laundry treatment machine implementing the method.

The laundry treatment machine may be for example a washing machine, a washer/drier, or a drier machine (to which the following description refers purely by way of example).

As is known, laundry treatment machines comprise a drum lighting device, normally housed inside a laundry chamber of the machine to illuminate the drum, so that the laundry inside the drum is visible to the user through the door of the machine, which faces the drum opening.

More specifically, the lighting device comprises a lamp or a LED located inside the wash chamber next to the door opening of the machine, and directed to light inside the drum; and an electric control unit configured to switch on/off the lighting device based on the opening/closure of the door.

Although the method for operating the lighting device implemented by the known electric control unit cited above allows to illuminate the laundry chamber when the door is open to make advantageously visible the laundry to be extracted by the user, there is the need to improve managing of the switch-off/on of the lighting device so that the inner part of the drum is also visible to the user after having performed some specific actions on the laundry treatment machine.

It is an object of the present invention to provide a laundry treatment machine comprising a drum lighting device designed to allow the user to have visibility inside the drum just after having performed some actions.

According to the present invention, there is provided method for operating a laundry treatment machine comprising an outer casing provided with a door, a drum mounted inside the outer casing, a drum lighting device arranged inside the outer casing and operable to light the drum, and a control unit adapted to control the lighting device; the method comprises:
switching-on drum lighting device if the control unit detects a preset action performed by a user on the laundry treatment machine and/or a preset state of the laundry treatment machine and/or of the drum lighting device;
switching-off drum lighting device if the control unit detects a preset action performed by a user on the laundry treatment machine and/or a preset state of the laundry treatment machine and/or of the drum lighting device.

There is a delay between the detection by the control unit of the preset action performed by a user on the laundry treatment machine and/or a preset state of the laundry treatment machine and/or of the drum lighting device, and the switching-off of the drum lighting device.

Preferably the delay is computed based on the detected preset action performed by a user on the laundry treatment machine and/or detected preset state of the laundry treatment machine and/or drum lighting device.

Advantageously the drum lighting device is switched-on when the door is open and is switched-off, after the delay, when the door is closed.

Advantageously the drum lighting device is switched-on when the control unit detects that the laundry treatment machine is switched-on and the door is closed and, wherein after a delay corresponding to a first predetermined value, the drum lighting device is switched-off.

Preferably if the control unit detects that the laundry treatment machine and the drum lighting device are in the switch-on state, and detects that user has moved the door from open position to closed position after the machine switched-on, the drum lighting device is switched off after a delay corresponding to a second predetermined value.

Advantageously the second predetermined value is greater than the first predetermined value.

Preferably, if the control unit detects that:
the laundry treatment machine is in a switch-on state,
the door is in a close state,
the drum lighting device is in a state of switch-off,
the laundry treatment machine is in a standby state,
user has performed cycle start command,
the drum lighting device is switched-on when the cycle start command is detected and it is switched-off after a delay corresponding to a third predetermined value.

In a further advantageous embodiment if the control unit detects that:
the laundry treatment machine is in a switch-on state,
the door is in a close state,
the drum lighting device is in a state of switch-on,
the laundry treatment machine is in a standby state,
user has performed cycle start command,
the drum lighting device is switched-off after the cycle start command has been detected, with a delay corresponding to a third predetermined value.

Advantageously the third predetermined value is lower than the first and second predetermined values.

In a further preferred embodiment if the control unit detects that:
the laundry treatment machine is in a switch-on state,
the door is in a closed state,
the drum lighting device is in a switch-off state,
the laundry treatment machine is in a operating cycle state,
user has performed a command associated to a cycle pause state,
the drum lighting device is switched-on and is switched-off after a delay corresponding to a forth predetermined value.

Preferably if the control unit detects that:
the laundry treatment machine is in a switch-on state,
the door is in a closed state,
the drum lighting device is in a switch-on state,
the laundry treatment machine is in a operating cycle state,
user has performed a command associated to a cycle pause state,
the drum lighting device is switched-off after the command associated to a cycle pause state has been detected, with a delay corresponding to a forth predetermined value.

Preferably the forth predetermined value is closed to the second predetermined value.

The invention regards also a laundry treatment machine comprising an outer casing provided with a door, a drum mounted inside the outer casing, a drum lighting device arranged inside the outer casing and operable to light the drum, and electronic control means configured to implement the inventive method according to the invention.

A non-limiting embodiment of the present invention will be described by way of example with reference to the accompanying drawings, in which.

Figure 1:
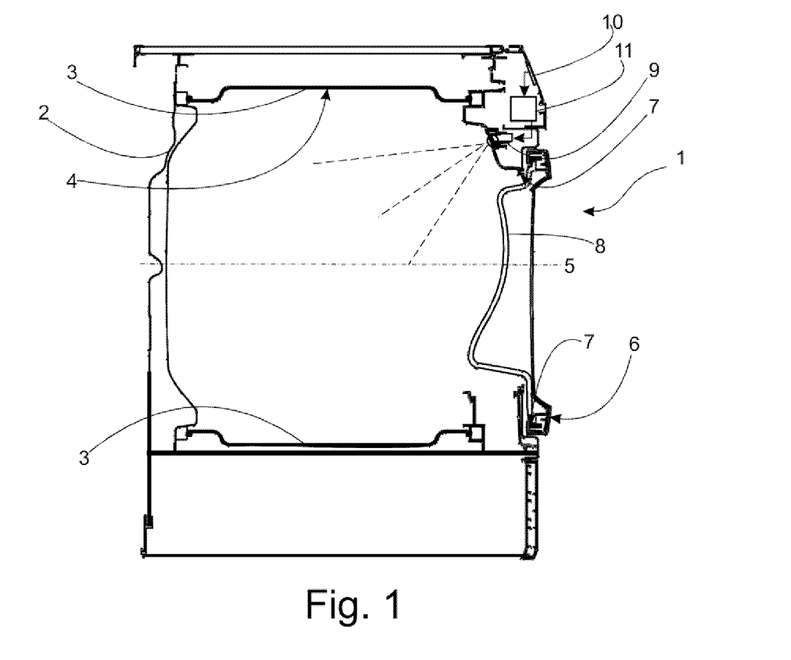
FIG. 1 shows a schematic lateral cross section of a laundry treatment machine provided with a drum lighting device implementing a control method according to the present invention.
Figure 2:
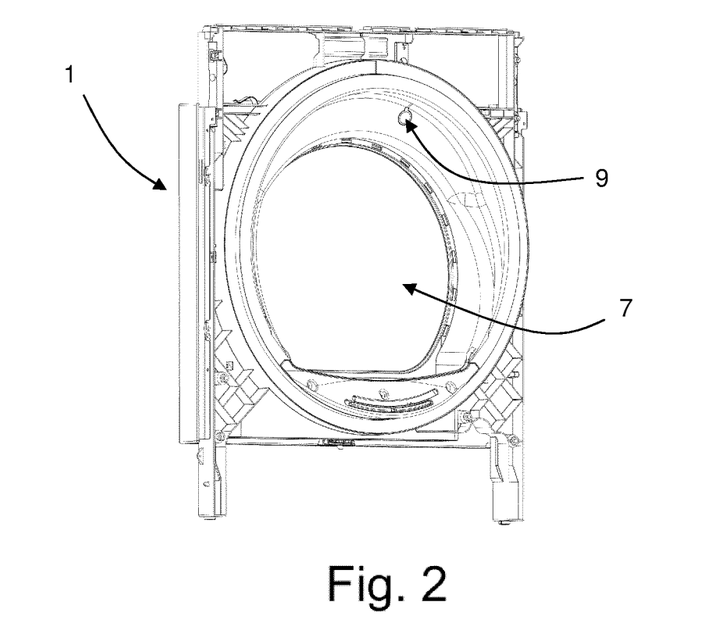
FIG. 2 shows an inner lateral wall of a laundry treatment machine housing a drum lighting device, in accordance with the teachings of the present invention.

Number 1 in FIG. 1 indicates as a whole a laundry treatment machine, such as a washing machine, a washer/drier, or a dryer machine, which advantageously comprises an outer casing 2 that preferably rests on the floor on a number of feet.

Casing 2 contains a laundry drum 3, which defines a laundry chamber 4 and preferably rotates about a preferably, though not necessarily, horizontal rotation axis 5. In an alternative embodiment not shown, rotation axis 5 may be vertical or inclined.

Laundry chamber 4 has a front access opening 7 closable by a door 8 preferably hinged to the front face 6 of casing 2 to rotate between a closed position, wherein the door closes front access opening 7 to seal laundry drum 3, and an open position, wherein the door 8 is separated from access opening 7 which remains opened.

Door 8 is preferably designed to allow user to observe the laundry inside the drum 3. At this purpose, the laundry treatment machine 1 preferably comprises a door 8 at least partially made with transparent material such as plastic or glass or similar material.

Laundry treatment machine 1 also comprises a drum lighting device 9, which is arranged inside the laundry chamber 4 to illuminate the laundry drum 3, so that the laundry is visible to the user through the at least partially transparent the door 8.

Preferably, drum lighting device 9 comprises a lamp or a LED (not shown), or any other similar kind of lighting sources located inside the laundry chamber 4, preferably near the access opening 7 of the machine 1, and is directed to light inside the drum 3.

Laundry treatment machine 1 also comprises a user control interface 10, which is found on the outer side of the casing 2 in order to allow user to perform actions, i.e. selecting commands to cause the machine 1 to perform operating phases.

Actions performed by the user via control interface 10 preferably comprises selection of the "operating cycle command", starting command of an operating cycle, interruption of the operating cycle by selecting a "pause command", (re) start the operating cycle after a pause, etc.

Laundry treatment machine 1 also comprises an electronic control unit 11, i.e. a microprocessor or similar electronic circuit, which is configured to control the lighting device 9.

Advantageously the control unit 11 is configured to:
switching-on the drum lighting device 9 if the control unit 11 detects a preset action (for example the opening or closure of the door 8, which may be detected by a suitable electronic sensor, the pressure of a start command, the pressure of a pause command, etc.) performed by a user on the laundry treatment machine and/or a preset state (for example the state of reached end of a drying cycle, the state of switching on of the machine, the state of standby etc.) of the laundry treatment machine and/or of the drum lighting device 9 (i.e. the state of being switched-on or of being switched-off);
switching-off the drum lighting device 9 if the control unit 11 detects a preset action (for example the opening or closure of the door 8, the pressure of a start command, the pressure of a pause command, etc.) performed by a user on the laundry treatment machine and/or a preset state (for example the state of reached end of a drying cycle, the state of switching on of the machine, the state of standby etc.) of the laundry treatment machine and/or of the drum lighting device 9 (i.e. the state of being switched-on or of being switched-off).

In the present application the expression "state of the laundry treatment machine and/or of the drum lighting device" means the situation in which the machine and/or the drum lighting device 9 is in a particular moment; e.g. the machine with the door closed or opened, the machine or the drum lighting device switched on or off, the machine performing a laundry treatment cycle (e.g. a drying or washing cycle) or in pause during a laundry treatment cycle, or after having reached the end of a laundry treatment cycle, etc.

Advantageously, the control unit 11 is configured in such a way to introduce a delay between the detection by the control unit 11 of a preset action performed by a user on the laundry treatment machine and/or a preset state of the laundry treatment machine 1 and/or of the drum lighting device 9, and the switching-off of the drum lighting device 9; thanks to this delay, the light is not immediately switched-off after a preset action has been performed by a user and/or a preset state has been reached by the machine 1 and/or by the drum lighting device 9.

For example the control unit 11 may be advantageously configured to switch-on the drum lighting device 9 when the door 8 is open (in this case the preset action is the opening of the door), and to switch-off the drum lighting device 9 after the door is closed (in this case the preset action is the closing of the door).

The control unit 11 is configured in such a way that the delay is computed based on the detected preset action performed by a user on the laundry treatment machine and/or the detected preset state of the laundry treatment machine and/or drum lighting device 9. In other words the duration of the delay depends on which preset action and/or preset state of the machine 1 and/or of the drum lighting device 9 has been detected.

Preferably, electronic control unit 11 is configured to switch-on the drum lighting device 9 when it detects that laundry treatment machine 1 is switched-on and the door 8 is closed (in this case the preset action detected by the control unit is the switching-on of the machine and the preset state of the machine is the situation on which the door is closed) and, after a delay, preferably corresponding to a predetermined value T1, switch-off the drum lighting device 9 (in this case the preset action and the preset state detected by the control unit 11 which cause the switching-off of the drum lighting device 9 are the same which cause the switching-on of the drum lighting device 9).

Preferably, delay value T1 is comprised between 3 sec and 1 min, more preferably it is roughly 10 seconds.

Electronic control unit 11 is advantageously configured to: detect that the laundry treatment machine and drum lighting device 9 are in the switch-on state; detect that user has moved the door from open position to the closed position after the machine switched-on; compute a delay preferably corresponding to a predetermined value T2; and switch-off drum lighting device 9 according to computed delay value T2.

In other words, if the drum lighting device is in the switch-on state, after closing the door 8 the drum lighting device 9 is not switched off immediately, but only after the predetermined delay value T2.

When the laundry treatment machine 1 is switched on, and the door 8 is open, electronic control unit 10 advantageously switches-on the drum lighting device 9. If user closes the door 8, the electronic control unit 10 detects changed machine states and, after door has been closed, switches-off the drum lighting device 9 after a delay value T2, so that user can advantageously check if there is laundry left inside the drum.

Preferably, value T2 is greater than value T1. Preferably, value T2 is comprised between 5 sec and 2 min, more preferably it is roughly 30 seconds.

Preferably control unit 11 is advantageously configured to:
detect a switch-on machine state,
detect the closed door state,
detect a state of switch-off of the drum lighting device 9,
detect a standby state (i.e. a state in which the machine remains at rest, waiting a user command, i.e. a cycle start command, to start an operating cycle or to continue a cycle after a pause) of the laundry treatment machine 1,
detect a cycle start command,
switch-on the drum lighting device 9 when the cycle start is detected,
switch-off the drum lighting device 9 after the switch-on the drum lighting device 9, with a delay corresponding to a predetermined value T3.

In a further embodiment control unit 11 is advantageously configured to:
detect a switch-on machine state,
detect the closed door state,
detect a state of switch-on of the drum lighting device 9,
detect a standby state (i.e. a state in which the machine remains at rest, waiting a user command, i.e. a cycle start command, to start an operating cycle or to continue a cycle after a pause) of the laundry treatment machine,
detect a cycle start command,
switch-off the drum lighting device 9 after cycle start command is detected, after a delay corresponding to a predetermined value T3.

Preferably, value T3 is lower than values T1 and T2. Preferably, value T3 is comprised between 2 sec and 30 sec, more preferably roughly 3 seconds.

Advantageously electronic control unit 11 is configured to:
detect a switch-on machine state,
detect closed door state,
detect a switching-off drum lighting device state,
detect an operating cycle state,
detect a user-command associated to a cycle pause state, which interrupts current operating cycle and causes laundry treatment machine to remain at rest, waiting a user command, i.e. new cycle start command, to start the operating cycle,
switch-on the drum lighting device 9;
switch-off the drum lighting device 9 after a delay corresponding to a predetermined value T4.

In a further embodiment electronic control unit 11 is configured to
detect a switch-on machine state,
detect closed door state,
detect a switching-on drum lighting device state,
detect an operating cycle state,
detect a user-command associated to a cycle pause state, which interrupts current operating cycle and causes laundry treatment machine to remain at rest, waiting a user command, i.e. new cycle start command, to start the operating cycle,
switch-off the drum lighting device 9 after detecting the command associated to a cycle pause state, with a delay corresponding to a forth predetermined value (T4).

Preferably, value T4 is similar to value T2. Preferably, value T4 is comprised between 5 sec and 2 min, more preferably roughly 30 seconds. It should be pointed out that delay values T1, T2, T3 and T4 are advantageously determined at the planning stage.

Figure 3:
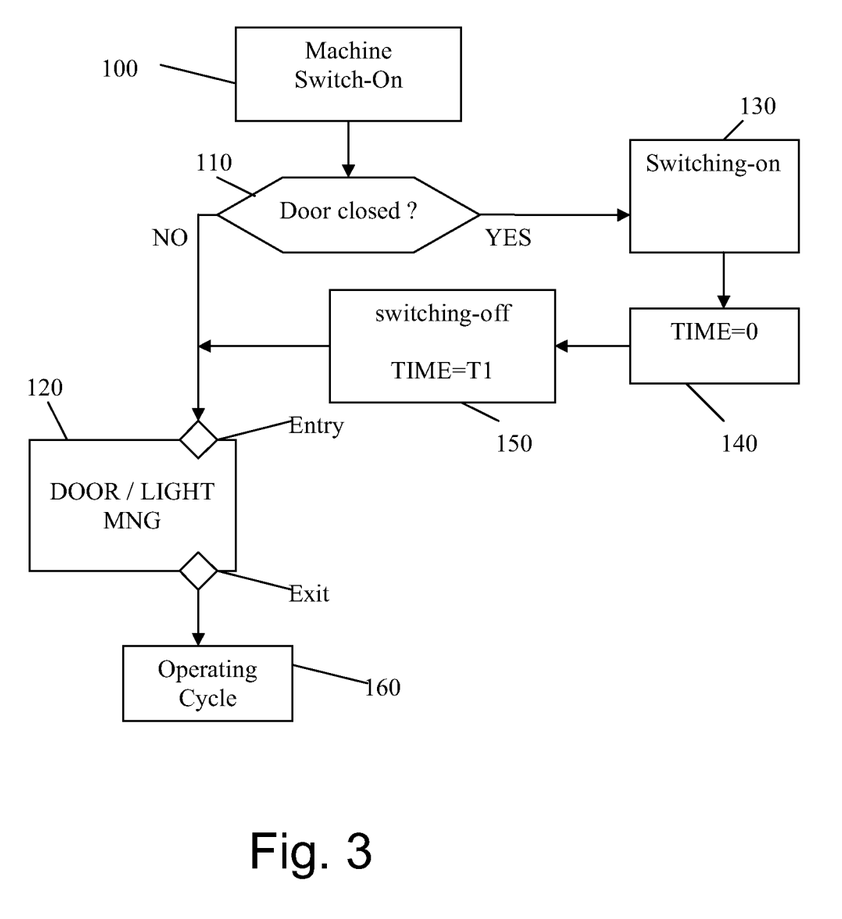
FIGS. 3, 4 and 5 show an operation flow chart of the control method implemented by the FIG. 1 laundry treatment machine.
Figure 4:
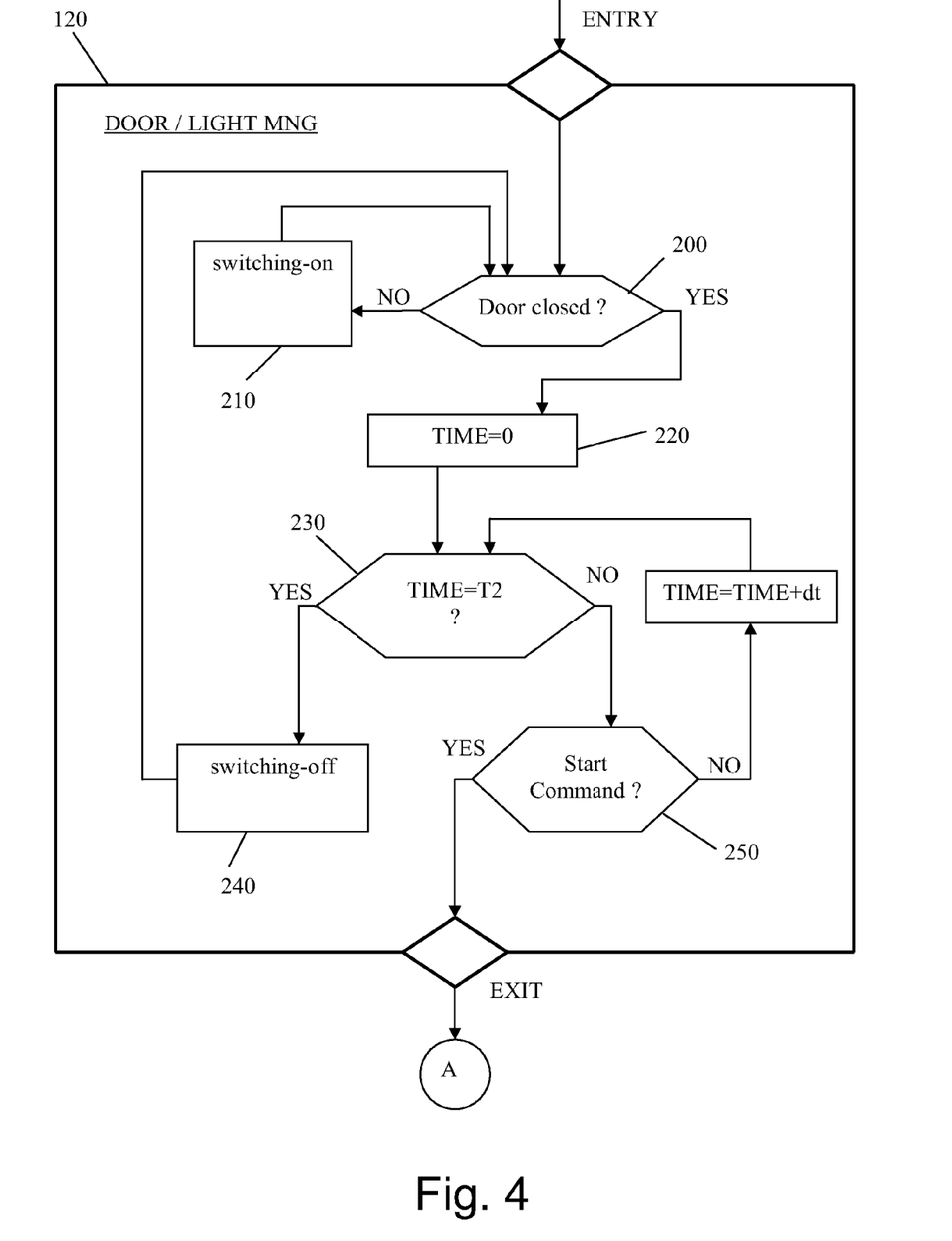
Figure 5:
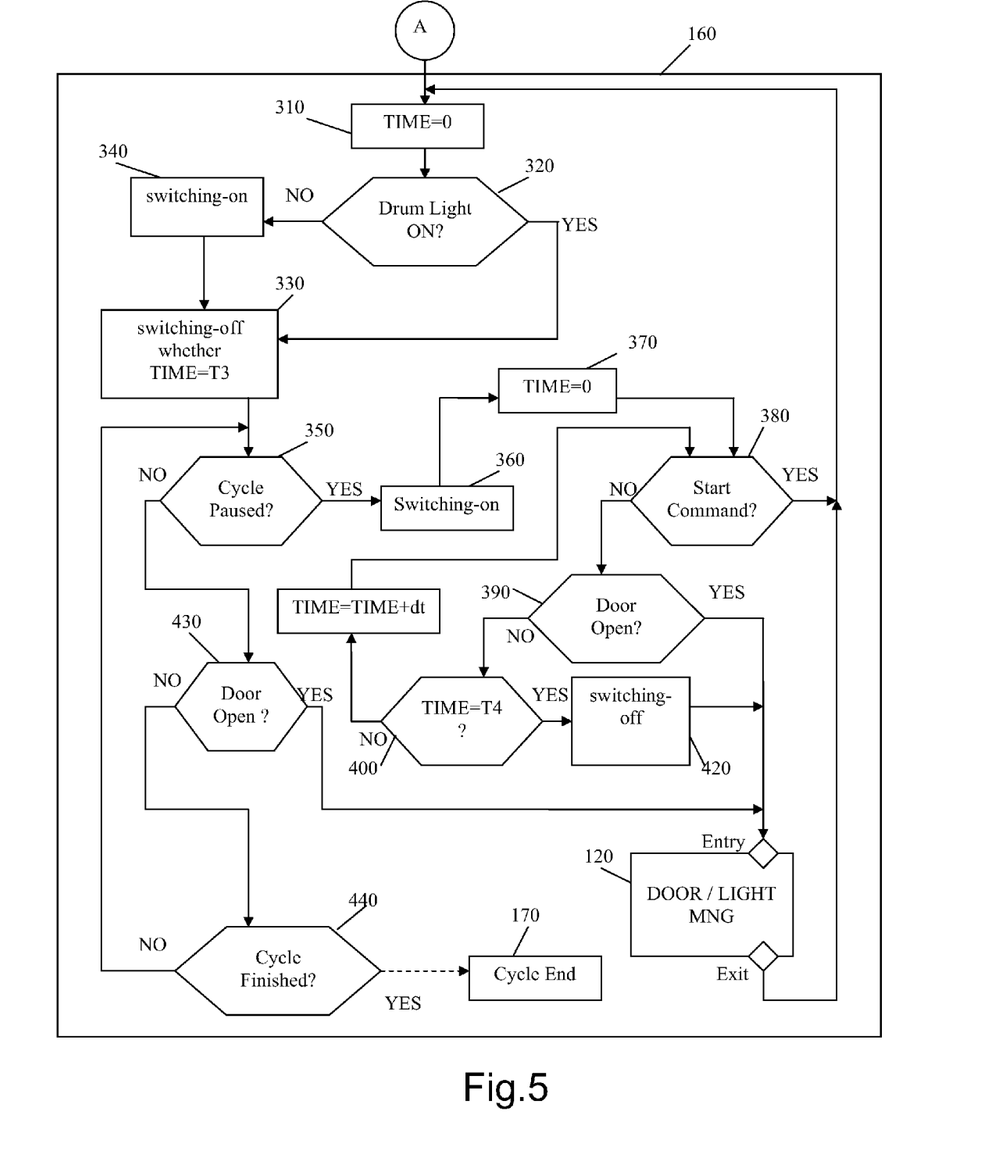

FIGS. 3, 4 and 5 show a flow chart of an example of the operations performed by electronic control unit 11 for operating the drum lighting device 9 in the laundry treatment machine 1 according to the present invention.

The first step (block 100) in FIG. 3 corresponds to the instant in which user switches-on the laundry treatment machine 1.

Electronic control unit 11 determines whether the door 8 is open/closed (block 110). If the door 8 is open (NO output of block 110) electronic control unit 11 performs the procedure hereinafter indicated as "DOOR/LIGHT MNG" (block 120) shown in the flow chart FIG. 4.

If the door 8 is closed (YES output of block 110), electronic control unit 11 operates the drum lighting device 9 (block 130) and initiates a control variable TIME=0 (block 140). In addition, electronic control unit 11 assigns to the delay the value T1, switches-off the drum lighting device 9, after a certain time from the instant TIME=0, namely when the variable TIME equals the delay value T1 (block 150).

Regarding the procedure "DOOR/LIGHT MNG" (shown in FIG. 4) (block 120 in FIG. 3), electronic control unit 11 determines whether the door 8 is open/closed (block 200). If the door 8 is open (NO output of block 200), electronic control unit 11 switches-on the drum lighting device 9 (block 210).

If the door 8 has been closed after machine switched-on (YES output of block 200), electronic control unit 11 initiates the variable TIME=0 and assigns to the delay the value T2 (block 220).

If variable TIME equals the delay value T2 (YES output of block 230), electronic control unit 11 switches-off the drum lighting device 9 (block 240) and performs the operations of block 200 again.

If variable TIME has not reached the delay value T2 (NO output of block 230) and electronic control unit 11 determines that user has performed actions, i.e. selection of a laundry operating cycle (YES output of block 250), than the procedure "DOOR/LIGHT MNG" ends (Exit) and the electronic control unit 11 operates the laundry treatment machine to perform the cycle selected by the user, i.e. "cycle start" and cycle execution (block 160, FIGS. 3 and 5).

With reference to FIG. 5, after receiving the cycle start command (Exit of DOOR/LIGHT MNG procedure), the electronic control unit 11 initiates the variable TIME=0 (block 310) and determines whether drum lighting device 9 is operating (block 320).

The electronic control unit 11 assigns to the delay the value T3 and switches-off the drum lighting device 9 at the delay value T3 (block 330) whether drum lighting device 9 is operating (YES output block 320).

The electronic control unit 11 assigns to the delay value the value T3 and switches-on the drum lighting device 9 (block 340) whether drum lighting device 9 is not operating (NO output block 320), and after the delay value T3 switches-off the drum lighting device 9 (block 330).

The electronic control unit 11 determines whether user has performed actions, i.e. selection of a pause (block 350). If it has (YES output of block 350), electronic control unit 11 operates the drum lighting device 9 (block 360), initiates the variable TIME=0 (block 370) and checks whether the user selected start command again (block 380).

If user selected start command again (YES output of block 380) electronic control unit 11 performs the operation of block 310 again.

If start cycle command has not been selected (NO output of block 380), electronic control unit 11 determines whether the door is open (block 390). If the door 8 is open (YES output of block 390), the electronic control unit 11 performs the operation of the procedure "DOOR/LIGHT MNG" above disclosed.

If the door 8 is closed (NO output of block 390), the electronic control unit 11 assigns to the delay the value T4 and time after time determines whether TIME=T4 (block 400). If TIME=T4 (YES output of block 400), electronic control unit 11 switches-off the drum lighting device 9 (block 420) and afterwards performs the operations of the procedure "DOOR/LIGHT MNG" above disclosed.

If the electronic control unit 11 determines that pause has not been selected (NO output of block 350), than it checks whether the door is open (block 430).

If the door is open (YES output of block 430), electronic control unit 11 performs the operations of the procedure "DOOR/LIGHT MNG".

If the door is closed (NO output of block 430), electronic control unit 11 checks whether the laundry cycle is finished (block 440). If it has not (NO output of block 440), electronic control unit 11 performs operating phases disclosed in the block 350 again.

If it has yes (YES output of block 440), electronic control unit 11 commands the laundry treatment machine to perform the end of the cycle (block 450).

Laundry treatment machine 1 has the major advantages of:
 allowing the user to have visibility inside the drum just after having performed some actions, for example "cycle start" or "cycle pause"; and
 highlighting the user particular machine/cycle status.

Clearly, changes may be made to the operating method or to the laundry treatment machine as described and illustrated herein without, however, departing from the scope of the present invention as defined in the accompanying Claims.

The invention claimed is:

1. A method for operating a laundry treatment machine comprising an outer casing provided with a door at least partially made with transparent material, a drum mounted inside the outer casing, a drum lighting device arranged inside the outer casing and operable to light the drum so that laundry loaded in said drum is visible to the user through said door, and a control unit adapted to control the lighting device;
 the method comprising:
  switching-on the drum lighting device if said control unit detects a preset action performed by a user on said laundry treatment machine and/or a preset state of said laundry treatment machine and/or of said drum lighting device;
  switching-off the drum lighting device if said control unit detects a preset action performed by a user on said laundry treatment machine and/or a preset state of said laundry treatment machine and/or of said drum lighting device;
  wherein there is a set delay between the detection by said control unit of said preset action performed by a user on said laundry treatment machine and/or a preset state of said laundry treatment machine and/or of said drum lighting device, and the switching-off of said drum lighting device;
  wherein if said control unit detects that:
   the laundry treatment machine is in a switch-on state,
   the door is in a closed state,
   the drum lighting device is in a switch-on state,
   the laundry treatment machine is in an operating cycle state,
   user has performed a command associated to a cycle pause state,
  the drum lighting device is switched-off after the command associated to a cycle pause state has been detected, with a delay corresponding to a predetermined value (A).

2. A method according to claim 1, wherein said set delay is computed based on said detected preset action performed by a user on said laundry treatment machine and/or detected preset state of said laundry treatment machine and/or drum lighting device.

3. A method according to claim 1, wherein said drum lighting device is switched-on when said door is open and is switched-off, after said set delay, when the door is closed.

4. A method according to claim 1, wherein the drum lighting device is switched-on when said control unit detects that said laundry treatment machine is switched-on and said door is closed and, wherein after a delay corresponding to a predetermined value (B), said drum lighting device is switched-off.

5. A method according to claim 4, wherein if said control unit detects said laundry treatment machine and said drum lighting device are in the switch-on state, and detects that the door has moved from an open position to a closed position after the machine switched-on, the drum lighting device is switched off after a delay corresponding to a predetermined value (C).

6. A method according to claim 5, wherein said predetermined value (C) is greater than said predetermined value (B).

7. A method according to claim 5, wherein if said control unit detects that:
 said laundry treatment machine is in a switch-on state,
 the door is in a closed state,
 the drum lighting device is in a state of switch-off,
 the laundry treatment machine is in a standby state,
 user has performed cycle start command,
 the drum lighting device is switched-on when the cycle start command is detected and it is switched-off after a delay corresponding to a predetermined value (D).

8. A method according to claim 7, wherein said third predetermined value is lower than said and predetermined values (B) and (C).

9. A method according to claim 5, wherein if said control unit detects that:
 said laundry treatment machine is in a switch-on state,
 the door is in a closed state,
 the drum lighting device is in a state of switch-on,
 the laundry treatment machine is in a standby state,
 user has performed cycle start command,
 the drum lighting device is switched-off after said cycle start command has been detected, with a delay corresponding to a predetermined value (D).

10. A method according to claim 9, wherein said predetermined value (D) is lower than said and predetermined values (B) and (C).

11. A method according to claim 1, wherein if said control unit detects that said laundry treatment machine and said drum lighting device are in the switch-on state, and detects that the door has moved from an open position to a closed position after the machine switched-on, the drum lighting device is switched off after a delay corresponding to a predetermined value (C).

12. A method according to claim 11, wherein said predetermined value (A) is close to said predetermined value (C).

13. A method according to claim 1, wherein if said control unit detects that:
 said laundry treatment machine is in a switch-on state,
 the door is in a closed state, the drum lighting device is in a state of switch-off, the laundry treatment machine is in a standby state,
user has performed cycle start command,
the drum lighting device is switched-on when the cycle start command is detected and it is switched-off after a delay corresponding to a predetermined value (D).

14. A method according to claim 1, wherein if said control unit detects that:
    said laundry treatment machine is in a switch-on state,
    the door is in a closed state, the drum lighting device is in a state of switch-on,
    the laundry treatment machine is in a standby state,
    user has performed cycle start command,
    the drum lighting device is switched-off after said cycle start command has been detected, with a delay corresponding to a predetermined value (D).

15. A method according to claim 1, wherein if said control unit detects that:
    the laundry treatment machine is in a switch-on state,
    the door is in a closed state,
    the drum lighting device is in a switch-off state,
    the laundry treatment machine is in a operating cycle state,
    user has performed a command associated to a cycle pause state,
    the drum lighting device is switched-on and is switched-off after a delay corresponding to a predetermined value (E).

16. A method, according to claim 15, wherein if said control unit detects that said laundry treatment machine and said drum lighting device are in the switch-on state, and detects that the door has moved from an open position to a closed position after the machine switched-on, the drum lighting device is switched off after a delay corresponding to a predetermined value (C), wherein said predetermined value (E) is close to said predetermined value (C).

17. A laundry treatment machine comprising an outer casing provided with a door, a drum mounted inside the outer casing, a drum lighting device arranged inside the outer casing and operable to light the drum, and electronic control means configured to implement the method as claimed in of claim 1.

\* \* \* \* \*